United States Patent [19]
Johnson

[11] Patent Number: 5,938,092
[45] Date of Patent: Aug. 17, 1999

[54] CONTINUOUSLY CURVED DRAWBAR FOR EXTENDING THE BED AND ENHANCING LOAD CARRYING CAPACITY OF A TRANSPORT VEHICLE

[76] Inventor: Brian K. Johnson, 2185 Goreville Rd., Goreville, Ill. 62939

[21] Appl. No.: 08/972,136

[22] Filed: Nov. 17, 1997

[51] Int. Cl.⁶ .............................. B60R 9/045; B60R 9/06
[52] U.S. Cl. .......................... 224/521; 224/485; 224/405; 224/501; 224/510; 224/523; 224/537; 224/486; 296/26.08
[58] Field of Search ................... 224/485, 405, 224/501, 510, 521, 523, 537, 486, 484, 487; 296/26.08, 3

[56] References Cited

U.S. PATENT DOCUMENTS

| | | | |
|---|---|---|---|
| 4,856,686 | 8/1989 | Workentine | 224/42.07 |
| 5,120,102 | 6/1992 | Cumbie | 296/3 |
| 5,244,392 | 9/1993 | Maursetter | 434/247 |
| 5,267,748 | 12/1993 | Curran | 280/415.1 |
| 5,395,020 | 3/1995 | King | 224/42.43 |
| 5,451,088 | 9/1995 | Broad | 296/26.08 |
| 5,458,389 | 10/1995 | Young | 296/26.08 |
| 5,469,997 | 11/1995 | Carlson | 224/521 |
| 5,520,498 | 5/1996 | DiBartolomeo | 414/680 |
| 5,640,949 | 6/1997 | Smith | 126/276 |
| 5,678,743 | 10/1997 | Johnson et al. | 224/485 |
| 5,680,976 | 10/1997 | Koliopoulos et al. | 224/524 |

*Primary Examiner*—Linda J. Sholl
*Attorney, Agent, or Firm*—Grace J. Fishel

[57] ABSTRACT

A continuously curved drawbar adapted to be mounted in a receiver hitch for extending the bed of a transport vehicle and enhancing load carrying capacity. The drawbar is formed as a box beam with a straight section at one end for receipt in the receiver hitch and rising above the receiver hitch at the second end. An adapter is provided at the end second for mounting a load. The curved drawbar reduces the amount of high-load impact transferred to the receiver hitch and resists permanent deflection.

10 Claims, 2 Drawing Sheets

CONTINUOUSLY CURVED DRAWBAR FOR EXTENDING THE BED AND ENHANCING LOAD CARRYING CAPACITY OF A TRANSPORT VEHICLE

BACKGROUND OF THE INVENTION

1. Field of the Invention

The present invention relates to a continuously curved drawbar adapted to be mounted in a receiver hitch for extending the bed and enhancing load carrying capacity of a transport vehicle. More particularly, the present invention relates to a curved drawbar adapted to be mounted in a receiver hitch for supporting a T-bar for carrying long lengths of building materials. The same drawbar, however, has other utilities.

2. Brief Description of the Prior Art

A number of different bed extenders have been proposed for carrying items having a length greater than the bed length of a vehicle. Some of these devices are described in U.S. Pat. No. 5,678,743 to Johnson et al., U.S. Pat. No. 5,458,389 to Young and U.S. Pat. No. 5,451,088 to Broad. With these devices it is possible to extend the bed between five and six feet from the receiver hitch and stay within feasible load limits.

In the Young patent, the drawbar is straight, five and one-half feet long and constructed of two-inch by two-inch by quarter-inch square steel tubing. Even without loading, which will cause the drawbar to sag slightly, the distal end of the drawbar may strike the ground when the front wheels of the vehicle are higher than the rear as when the vehicle backs down an inclined driveway into a street or goes over a speed bump, railroad track or the like. Both Johnson et al. and Broad address this problem by providing an angled drawbar that is elevated at its distal end above the receiver hitch. In both Johnson et al. and Broad, the drawbar is formed from cut sections of square steel tubing which are welded together so that the drawbar is upwardly directed. The Johnson et al. construction has gussets for reinforcing each angled joint.

When a load is applied on the distal end of the drawbar, all of the above-mentioned bed extenders deflect slightly, this being a more serious problem in the Young construction which has poor ground clearance even when not loaded. With the Johnson et al. and Broad extenders, as the drawbar deflects, the top of the drawbar is put under tension and the bottom is put under compression, which stresses are concentrated at the joints, the Johnson et al. construction being reinforced at those points. The cut-and-weld angled drawbars described by Johnson et al. and Broad are stiff such that when a loaded vehicle is driven over a rut, speed bump, railroad track or the like, the jolt (i.e., high-load impact) caused by the load on the T-bar is transferred through the drawbar to the receiver hitch. While the Johnson et al. bed extender is designed to withstand these forces, it would be desirable if the drawbar absorbed part of them. The stiffness of the angled drawbars also causes them to be permanently bent under some circumstances.

There are other opportunities for improvement. While the cut-and-weld drawbars of Johnson et al. and Broad are an improvement over the straight drawbar shown in the Young patent, they are more expensive to make because of the labor in the welds. It would be desirable, therefore, to have a drawbar that is upwardly angled, providing for ground clearance and deflection, without having the welds.

BRIEF SUMMARY OF THE INVENTION

In view of the above, it is an object of the present invention to provide a drawbar for extending the bed of a transport vehicle and for reducing the amount of high-load impact passed to the receiver hitch. It is another object to provide a drawbar that is less expensive to fabricate and has less tendency to be permanently deflected under high-load impact. Other objects and features of the invention will be in part apparent and in part pointed out hereinafter.

In accordance with the invention, a drawbar is provided for use with a receiver hitch of the type having a receiver with a rectangular opening mounted on a vehicle. The drawbar, in major part, includes a box tubing beam with first and second ends and an adapter for mounting a load attached to the second end.

The box tubing beam has a straight section conformed to be received in a receiver hitch and secured with a fastener. The box tubing beam has a top and bottom wall connected with sidewalls and is continuously curved upward from the straight section. As the box tubing beam flexes under high-load impact, some of the compressive, tensile and torsional forces are absorbed by the drawbar, reducing the amount of high-load impact transferred to the receiver hitch. In addition, the springiness of the drawbar causes it to have better restorative ability and less tendency to deflect permanently under load as compared to a cut-and-weld drawbar, evidence of which is provided hereinafter.

In a preferred embodiment, the adapter is attached to the second end of the box tubing beam at an angle from one to ten degrees from perpendicular, canted towards the first end of the drawbar, so that when a load is applied to the second end of the drawbar, the adapter is brought into vertical position.

In other preferred embodiments, a T-bar is attached to the adapter for use with a vehicle having a flat bed. The T-bar has a horizontal cross bar supported on a leg that is slidably received in the adapter of the drawbar. The leg has a plurality of spaced apart holes for removably securing the leg with a pin to the adapter and for adjusting the height of the horizontal cross bar level with respect to the flat bed.

The horizontal cross bar may have a pair of L-shaped arms that are slidably received in opposite ends thereof. When the L-shaped arms have a plurality of spaced apart holes arranged in two orthogonal sets, each arm may be removably secured with a pin to the horizontal bar for adjusting the spacing between the arms and for positioning the arms vertically or horizontally.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, one of various possible embodiments of the invention is illustrated, corresponding reference characters referring to corresponding parts throughout the several views of the drawings in which.

DETAILED DESCRIPTION OF THE INVENTION

Figure 1:
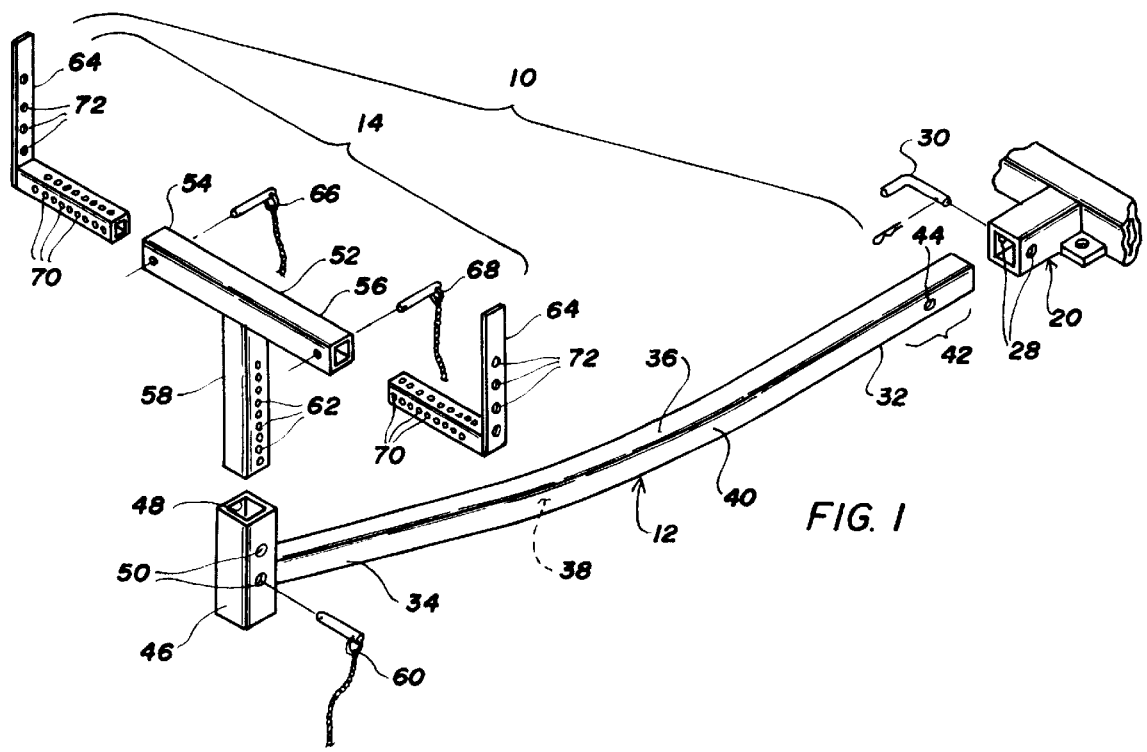
FIG. 1 is an exploded perspective view of a continuously curved drawbar for attachment of a T-bar, providing a bed extender in accordance with the present invention.

Referring to the drawings more particularly by reference character, reference numeral 10 refers to a bed extender including a drawbar 12 in accordance with the present invention and a T-bar 14 for carrying long lengths of building materials 16 or the like.

Figure 2:
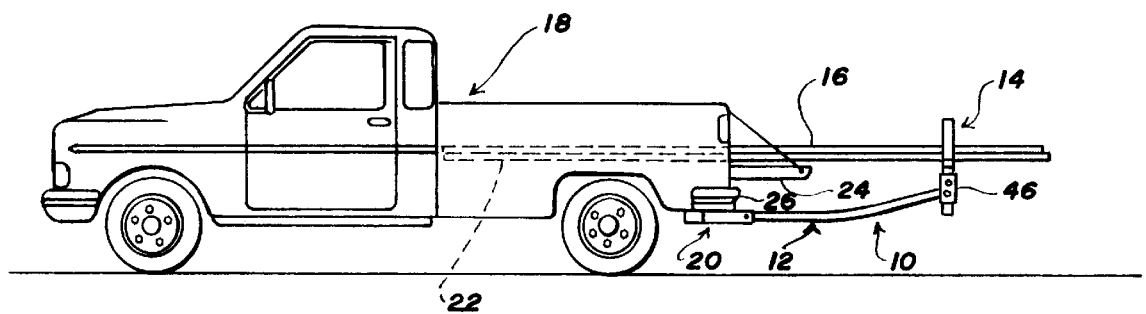
FIG. 2 is a side elevational view of the bed extender shown in FIG. 1 extending the bed of a truck.
Figure 3:
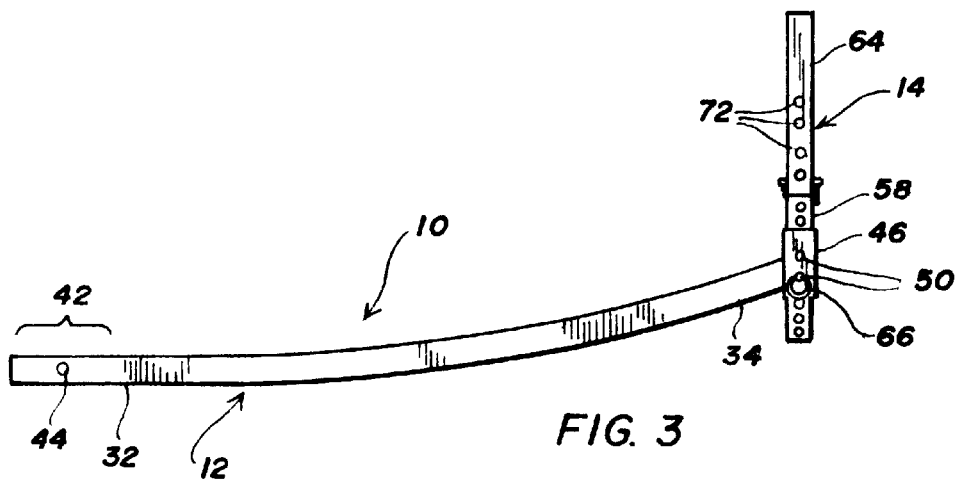
FIG. 3 is a side elevational view of the bed extender.
Figure 4:
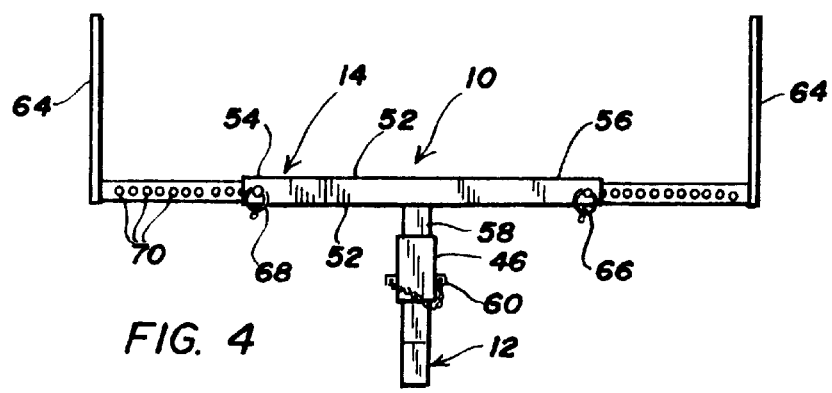
FIG. 4 is rear elevational view of the bed extender.
Figure 5:
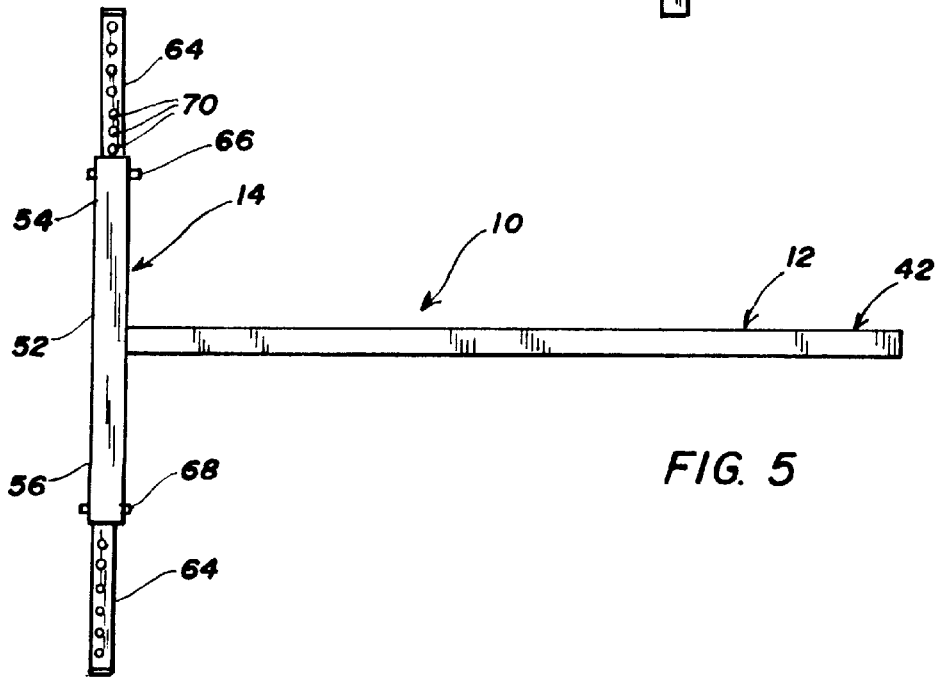
FIG. 5 is a top view of the bed extender.

Bed extender 10 is adapted for use on a vehicle 18 such as a pickup truck, van, sport utility vehicle or the like having a receiver hitch 20 such as are sold under the trademark REESE, DRAWTIGHT, etc. As shown in FIG. 2, truck 18 has a flat bed 22, a rear tailgate 24 and a bumper 26. Tailgate 24 moves between an upright closed position and an open, generally horizontal extended position from flat bed 22. Receiver hitch 20 is formed from hollow tubing having square external and internal cross-sections and is normally centrally attached to the frame of vehicle 18, below rear bumper 26. On most pickups, the internal cross-section of the receiver is 2 inches or, on some small trucks 1¼ inches. Receiver hitch 20 has generally horizontal paired holes 28 for receipt of a hitch pin 30 by means of which a trailer or bed extender 10 can be attached.

Drawbar 12 is a box tubing beam cantilevered from receiver hitch 20 and has first and second ends 32, 34, respectively, the first of which is adapted to be received and retained in receiver hitch 20 by hitch pin 30. Drawbar 12 is formed of hollow square tubing with a top wall 36 and a bottom wall 38 connected with sidewalls 40. First end 32 has a straight section 42 sized to be slidingly received in receiver hitch 20 and provisioned with generally horizontal paired holes 44 through which hitch pin 30 passes. Drawbar 12 is continuously curved upward from straight section 42, the curvature being viewed as the drawbar is mounted in receiver hitch 20, second end 34 rising above receiver hitch 20. Drawbar 12 has a length such that it flexes under high-load impact when a load is applied at second end 34 as vehicle 18 is driven over a rut, speed bump, railroad track or the like.

Drawbar 12 may be roll formed under ambient conditions from a section of hollow square tubing, cut to length and suspended on two transverse rollers spaced about ten inches inboard first and second ends 32, 34, respectively. A ¼ inch roll rod is conformed to and welded on an arcuate periphery of a shoe measuring about 3½ feet long. The curved rod on the shoe is pressed against top wall 36 of the square tubing, causing the box tubing beam to bow a little past the amount of curvature shown in the drawings so that it assumes the shape shown in the drawings when the pressure is released. If drawbar 12 were bent, as opposed to roll formed, the sides and top of the box beam would tend to blow out.

An adapter 46 is provided on second end 34 of drawbar 12 for mounting a load. In simple form, adapter 46 may be a hole for attachment of the load. As shown in the drawings, however, adapter 46 is a collar attached substantially perpendicular to second end 34 of drawbar 12. Collar 46 has an upper and a lower end and a channel 48 extending therethrough. Channel 48 is adapted for attachment of a device, such as T-bar 14, for carrying a load. While drawbar 12 is particularly adapted for use with T-bar 14 in carrying long lengths of building materials, other devices such as a workbench, hoist, recreational equipment, etc. may be attached to the drawbar in place of the T-bar as desired.

Channel 48 may be circular or have some other configuration but is preferably square when the adapter is made from a section of hollow square tubing. Adapter 48 may have the same inside dimensions as drawbar 12, although it may be made of lighter gauge material. Because drawbar 12 is designed to flex, adapter 46 is preferably welded or the like at an angle from one to ten degrees from perpendicular, preferably about seven degrees, canted towards first end 32, so that when a load is applied to second end 34 of drawbar 12, channel 48 is brought into vertical position. Adapter 46 has a pair of aligned holes 50 for attachment of a load.

T-bar 14 has a horizontal cross bar 52 with first and second ends 54, 56, respectively. Horizontal cross bar 52 is supported by a leg 58 to which it is fixedly attached, preferably midway its length, by welding or the like. Leg 58, like drawbar 12, is preferably formed of square tubing and is slidingly received in channel 48. A hitch pin 60 is provided for removably securing leg 58 in adapter 46 and for adjusting the height of horizontal cross bar 52 with respect to flat bed 22. To this end, leg 58 may be provisioned with a plurality of spaced apart holes 62 through which second hitch pin 60 passes when aligned with holes 50 in adapter 46. For additional adjustability, adapter 46 may be provided with an additional set of holes 50, said holes set at a closer spacing than holes 62 in leg 58.

In a preferred form, a pair of upwardly directed L-shaped arms 64 are slidingly received in horizontal cross bar 52, preferably having paired holes for receipt of third and fourth hitch pins 66, 68, respectively. The horizontal sections of L-shaped arms 64 are preferably formed of square tubing and have a plurality of spaced apart holes 70 through which third and fourth hitch pins 66, 68 pass when aligned with the holes in horizontal cross bar 52 for adjusting the spacing between said arms. The vertical section of L-shaped arms 64 may also be provided with a plurality of spaced apart holes 72 for use as described hereinafter. The tips of L-shaped arms 64 may be covered with a plastic or rubber cap (e.g., by dipping the vertical sections of L-shaped arms 64 in molten plastic or the like) and the top surface of horizonal cross bar 52 may be provided with a plastic or rubber pad to avoid marring goods loaded on the bed extender. Hitch pins 30, 60, 66 and 68 may be any suitable fastener secured with a cotter pin, nut, etc.

A commercial embodiment of bed extender 10 weighs less than 50 pounds and has a curved drawbar 12 that is 60 inches long with a 7 inch rise and a T-bar that is adjustable to a width of 50 inches (e.g., to carry a sheet of plywood or drywall). At this weight, the square tubing forming drawbar 12 is cold rolled and measures two inches by two inches with a wall thickness of one-quarter inch. Adapter 46 measures two inches by two inches with an inside dimension of 1¾ inches by 1¾ inches, leg 58 is 1¾ inches by 1¾ inches, horizontal cross bar 52 has an internal cross-section of 1½ inches by 1½ inches and horizontal sections of L-shaped arms 64 an external cross-section of 1½ inches by 1½ inches. Adapter 26 and T-bar 14 are formed of 12 gauge steel.

The length and degree of curvature of drawbar 12 should be such that T-bar 14 is at a sufficient distance from tailgate 24 to permit the tailgate to move without interference between an upright closed position and an open, generally horizontal extended position from flat bed 22. Some trucks have a cargo net instead of a tailgate and the doors at the rear of vans and sport utility vehicles may be center or top opening. It will understood, therefore, that a tailgate is not required to use bed extender 10 but is discussed for the purpose of dimensioning bed extender 10 for use with vehicles that do have tailgates.

While the aforementioned bed extender is preferred and will work with most pickups, drawbar 12 and T-bar 14 may be made of materials having other lengths or wall thicknesses so long as the desired structural strength and flex in drawbar 12 is achieved. The metallurgical composition and treatment of the metal and other such factors, as will occur to those skilled in the art, will also affect strength and flexibility.

Bed extender 10 may be painted a bright color, such as international orange, so that it does not blend with vehicle 18 and reflectors may be attached to T-bar 14, supplemented with a red flag when the load exceeds the legal limit.

Bed extender 10 may be stored behind the driver's seat or in flat bed 22, ready for use when required, with L-shaped arms 64 removed from horizontal cross bar 52, leg 58 removed from adapter 46 and drawbar 12 detached from receiver hitch 20. When needed, drawbar 12 is mounted in receiver hitch 20 with hitch pin 30 and T-bar 14 mounted in adapter 46. The height of horizontal cross bar 52 may be adjusted level with flat bed 22 with second hitch pin 60 and the spacing between L-shaped arms adjusted with third and fourth hitch pins 66, 68, respectively. Goods are then loaded on the truck, supported at second end 34 of drawbar 12 on T-bar 14, secured with a bungee cord or the like hooked into holes 72 in L-shaped arms 64, if desired.

When vehicle 18 is driven over a rut, speed bump, railroad tracks or the like, a high-load impact is applied on T-bar 14, causing drawbar 12 to flex. When drawbar 12 flexes, the amount of the high-load impact transferred to receiver hitch 20 is reduced, while also decreasing the amount of residual deflection as compared to a cut-and-weld unit, as shown below.

A welded bed extender like that described in U.S. Pat. No. 5,678,743 was tested for deflection under various loads. After each test, the bed extender was measured for residual deflection. The results are shown in the following table:

| Cut-and-weld Truck Bed Extender, 2" Sq. O.D., 3/16" Wall | | | | | |
|---|---|---|---|---|---|
| | LOAD IN POUNDS | | | | |
| | 450 | 550 | 650 | 750 | 850 |
| CENTER POINT LOAD, SAMPLE A (angle monitored 12 inches from service end) Welded Unit-Length, Hole to Hole, 54.5" | | | | | |
| Under Load | 1.5° | 2.0° | 3.0° | 3.5° | 4.5° |
| Residual | 0° | 0° | 0.5° | 1.0° | 1.5° |
| End Displacement Under Load | | | | | 3.0" |
| OFF CENTER LOAD, SAMPLE A (angle monitored 4.5" from center with "T" in raised position and load applied 11.5" from center) | | | | | |
| Under Load | 1.5° | 2.0° | 3.0° | 3.0° | 4.0° |
| Residual | 0° | 0.5° | 0.5° | 0.5° | 1.0° |
| End Displacement Under Load | | | | | 6.0" |

A curved bed extender as described herein, longer than the cut-and-weld extender discussed above, was tested for deflection under various loads by the same laboratory that tested the welded unit. As with the welded unit, the bed extender was measured for residual deflection after each test. The results are shown in the following table:

| Continuously Curved Truck Bed Extender, 2" Sq. O.D., 3/16" Wall | | | | | |
|---|---|---|---|---|---|
| | LOAD IN POUNDS | | | | |
| | 450 | 550 | 650 | 750 | 850 |
| CENTER POINT LOAD, SAMPLE B (angle monitored 12 inches from service end) Curved Unit-Length, Hole to Hole, 56.5" | | | | | |
| Under Load | 2.0° | 2.0° | 2.5° | 3.0° | 4.5° |
| Residual | 0° | 0° | 0.5° | 1.0° | 1.0°+ |
| End Displacement Under Load | | | | | 3.5" |
| OFF CENTER LOAD, SAMPLE B (angle monitored 4.5" from center with "T" in raised position and load applied 11.5" from center) | | | | | |
| Under Load | 1.5° | 2.5° | 3.5° | 4.0° | 4.5° |
| Residual | 0° | 0.5° | 0.5° | 0.5° | 1.0° |
| End Displacement Under Load | | | | | 5.5" |

When L-shaped arms 64 are formed of square tubing having two pairs of orthogonal holes, the arms can be slidably received in horizonal cross bar 52 so as to form, with the horizontal cross bar, a portable work platform. The top surface of the work platform is at a height generally level with flat bed 22 and the plane of the horizontally extended open tailgate 24 of the truck thereby permitting the work platform to be effectively employed by the user without hindrance.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A drawbar for use with a receiver hitch of the type having a receiver with a rectangular opening, the receiver mounted to a vehicle, said drawbar comprising
   a box tubing beam with first and second ends, said first end having a straight section conformed to be received in a receiver hitch and secured with a fastener; said box tubing beam having a top and a bottom wall connected with sidewalls; said box tubing beam being continuously curved upward from the straight section; said box tubing beam having a length such that it flexes under high-load impact at the second end, thereby reducing the amount of high-load impact transferred to the receiver hitch; and,
   an adapter for mounting a load attached to the second end of the box tubing beam.

2. The drawbar of claim 1 wherein the adapter is a collar attached substantially perpendicular to the second end of the box tubing beam, said collar having a channel extending therethrough, said channel adapted to hold a device carrying a load.

3. The drawbar of claim 2 wherein the collar has an upper and a lower end and is attached to the second end of the box tubing beam at angle of one to ten degrees from perpendicular, said upper end of the collar canted towards the first end of the box tubing beam, whereby the collar straightens vertically under a load applied at the second end of the box tubing beam.

4. The drawbar of claim 3 wherein the collar is formed of box tubing.

5. A drawbar for use with a receiver hitch of the type having a receiver with a rectangular opening, the receiver mounted to a vehicle, said drawbar comprising
   a roll formed box tubing beam with first and second ends, said first end having a straight section conformed to be received in a receiver hitch and secured with a locking fastener; said box tubing beam having a top and a bottom wall connected with sidewalls; said box tubing beam being continuously curved upward from the straight section; said box tubing beam having a length such that it flexes under high-load impact at the second end, thereby reducing the amount of high-load impact transferred to the receiver hitch; and a box tubing collar attached substantially perpendicular to the second end of the box tubing beam, said box tubing collar having an upper and a lower end and a rectangular opening extending vertically therethrough and a fastener for mounting a load.

6. The drawbar of claim 5 wherein the box tubing beam is between about five and six feet long and wherein the box tubing collar is attached to the box tubing beam at an angle of one to ten degrees from perpendicular, said upper end of the box tubing collar canted towards the first end of the box tubing beam.

7. A bed extender for enhancing load carrying capacity for use with a receiver hitch of the type having a receiver with a rectangular opening, the receiver mounted to a vehicle having a flat bed, said bed extender comprising a drawbar and a T-bar, said drawbar being a box tubing beam with first and second ends, said first end having a straight section conformed to be received in a receiver hitch and secured with a fastener; said box tubing beam having a top and a bottom wall connected with sidewalls; said box tubing beam being continuously curved upward from the straight section; said box tubing beam having a length such that it flexes under high-load impact at the second end, thereby reducing the amount of high-load impact transferred to the receiver hitch, said drawbar having an adapter at the second end; and, said T-bar being a horizontal cross bar supported on a leg which is slidably received in said adapter of the drawbar, said leg having a plurality of spaced apart holes for removably securing the leg with a fastener to the adapter and for adjusting the height of the horizontal cross bar level with respect to the flat bed.

8. The bed extender of claim 7 wherein the adapter is a collar formed of box tubing and is attached substantially perpendicular to the second end of the box tubing beam, said collar having a channel extending therethrough, said channel adapted to slidably receive the leg of said T-bar.

9. The bed extender of claim 8 wherein the collar has an upper and a lower end and is attached to the second end of the box beam at an angle of one to ten degrees from perpendicular, said upper end of the collar canted towards the first end of the box tubing beam, whereby the collar straightens vertically under a load applied on the T-bar at the second end of the box tubing beam.

10. The bed extender of claim 9 wherein the horizontal cross bar has first and second ends, at each of which is removably secured an L-shaped arm, said arms slidably received in the horizontal cross bar and having a plurality of spaced apart holes arranged in two orthogonal sets by means of which each arm is movably secured with a fastener to the horizontal cross bar for adjusting the spacing between said arms and for positioning the arms vertically or horizontally.

* * * * *